United States Patent [19]

Bossel

[11] Patent Number: 5,338,621
[45] Date of Patent: Aug. 16, 1994

[54] APPARATUS FOR CONVERTING CHEMICAL ENERGY OF FUEL INTO ELECTRICAL ENERGY WITH A PLURALITY OF HIGH-TEMPERATURE FUEL CELLS

[76] Inventor: Ulf Bossel, Baldeggstrasse 13, CH-5400 Baden, Switzerland

[21] Appl. No.: 941,045
[22] PCT Filed: Feb. 24, 1992
[86] PCT No.: PCT/EP92/00384
§ 371 Date: Mar. 9, 1992
§ 102(e) Date: Mar. 9, 1992
[87] PCT Pub. No.: WO92/16029
PCT Pub. Date: Sep. 17, 1992

[30] Foreign Application Priority Data
Mar. 5, 1991 [CH] Switzerland ............ 00654/91

[51] Int. Cl.⁵ ................. H01M 8/24; H01M 2/00
[52] U.S. Cl. ........................ 429/18; 429/30; 429/40; 429/44; 429/34
[58] Field of Search .............. 429/10, 30, 40, 44, 429/12, 34; 204/252, 265, 266

[56] References Cited

U.S. PATENT DOCUMENTS 3,400,054  9/1968  Ruka et al. ............... 204/1
4,416,747  11/1983  Menth et al. ............. 204/129

FOREIGN PATENT DOCUMENTS 0357025  3/1990  European Pat. Off. .
0361383  4/1990  European Pat. Off. .
0406523  1/1991  European Pat. Off. .
4004271  8/1990  Fed. Rep. of Germany .

OTHER PUBLICATIONS

Tanabe et al., Cathodic Polarization Characteristics at the Oxygen Electrode/Stabilized $Bi_2O_3$ Solid Electrolyte Interface; 2369 Electrochimica Acta, 31(1986) Jul.; No. 7, Oxford, Gr. Britain, pp. 801–809.
Japanese Abstract 63-97657 Oct. 1989.

Primary Examiner—Kathryn Gorgos
Attorney, Agent, or Firm—Andersson Kill Olick & Oshinsky

[57] ABSTRACT

An apparatus for converting chemical energy of a fuel into electrical energy includes a plurality of high-temperature fuel cells, which extend parallel to each other, with each fuel cell having an oxygen electrode comprising SrO-doped Mn oxides and having a Cr surface layer, and fuel electrodes comprising $Ni/ZrO_2$ cermet and having Ni surface layers, a separating plate constructed as a hollow body for guiding, distributing and collecting gaseous media, and a highly elastic constructional element in the form of a gas-permeable intermediate layer, which acts as a high-temperature spring between the separating plate and the current collectors.

10 Claims, 7 Drawing Sheets

APPARATUS FOR CONVERTING CHEMICAL ENERGY OF FUEL INTO ELECTRICAL ENERGY WITH A PLURALITY OF HIGH-TEMPERATURE FUEL CELLS

BACKGROUND OF THE INVENTION

The invention is directed to an apparatus of the generic type for the conversion of chemical energy of a fuel into electrical energy with a plurality of high-temperature fuel cells layered parallel to one another with a solid electrolyte, an oxygen electrode, a fuel electrode, a separating plate between adjacent fuel cells, with current collectors between a separating plate and the respective opposing adjacent electrode for the electrically conductive connection of adjacent fuel cells, and with members for supplying and carrying off the gaseous media.

Fuel cells with ceramic solid electrolytes have been described many times in numerous publications. Some of the multitude of available publications are indicated as follows only by way of example:

U.S. Pat. No. 4,692,274
U.S. Pat. No. 4,618,543
U.S. Pat. No. 4,395,468
U.S. Pat. No. 3,400,054
U.S. Pat. No. 3,429,749
EP-A-0 357 025
EP-A-0 406 523
DE-A-40 04 571
Patent Abstract of Japan, vol. 14, no. 32 (E-876) (3975) V. Jan. 22, 1990
ELECTROCHIMICA ACTA. Volume 31, No. 7, pages 801 to 809, July 1986.

The known fuel cell constructions and arrangements do not yet satisfy modern industrial requirements respecting reliability and management of operation, constancy of temperature, service life and simplicity of maintenance. The object of the present invention is, therefore, to simplify such devices and to improve their operation management, particularly to improve, ensure and simplify the constructional and electrical conditions. It is a particular object of the present invention to ensure a uniform supply of air and combustion gas to the electrochemically active surfaces and a faultless transmission of current from a fuel cell to an adjacent fuel cell while preventing transverse currents in the electrodes, wherein the gaseous media can be guided to and from the electrodes in such a way that the most uniform possible operating temperature can be achieved over the entire electrode surface in an inexpensive manufacture, with low-cost maintenance and quick exchangeability of individual elements and with a long service life.

SUMMARY OF THE INVENTION

This object is met according to invention by the providing an apparatus, of the above-described generic type, in which the oxygen electrode comprises Mn oxides doped with SrO and having a Cr surface layer, and wherein the fuel electrode comprises $Ni/ZrO_2$ cermet with a Ni surface layer, and further wherein the separating plate is constructed as a hollow body for guiding, distributing and collecting gaseous media, and wherein a highly elastic constructional element in the form of a gas-permeable intermediate layer, acting as a high-temperature spring, is provided between the separating plate and the current collectors.

In contrast to the solution known from the prior art, the invention has the particular advantages that the supply of gaseous fuel and of the gaseous oxygen carrier to the individual electrodes can be effected simultaneously practically vertically relative to the entire surface. Accordingly, a uniform concentration of these gaseous media, i.e. also a uniform electrochemical conversion and accordingly a uniform temperature of the fuel cell along the entire electrode surface (quasi-isothermal operation), is achieved.

By constructing the separating plate as a hollow body with additional profiling, the problems of maintaining a constant temperature, supplying and carrying off the same gaseous media, and maintaining and exchanging in the event of disturbances are solved optimally in a simple manner.

A uniform mechanical and electrical charging of all contact points on the electrodes is achieved by means of the gas-permeable ceramic intermediate layers supported on the separating plate which act vertically relative to the plane of the plate as a high-temperature spring and press the current collectors against the opposing electrodes of two adjacent fuel cells in a uniform manner and over a large surface area. Local overloading, burning through and additional current heat losses are accordingly prevented.

The magnitude of the electrode surface is not encumbered by the usual narrow limits imposed by contact problems and difficulties in guiding gaseous media. A plurality of ceramic electrolyte plates of smaller dimensions can even be arranged adjacent to one another between two large surface area metallic separating plates.

The arrangement of the plate plane in the vertical position facilitates the external supply and removal of the gaseous media, the accessibility and exchangeability of the individual structural component parts, and reduces the overall height of stacks, modules and entire blocks.

The use of conventional elastic seals with reliable seal characteristics is made possible in that the fuel supply runs from the hot to the cold region of the installation by means of the handle-like continuation of the separating plate.

The guidance of gas along the surface area in the interior of the separating plate makes it possible not only to preheat the gas flow, but also to carry out endothermal chemical conversion reactions immediately prior to the outlet of gas to the fuel electrode while making use of the waste heat occurring in the stack, i.e. enables a homogeneous cooling of the fuel cell along the surface area.

Optimal conditions for carrying out such aimed for reactions are created in situ in that catalysts accelerating the endothermal reactions are accommodated in the interior of the separating plate constructed as a hollow body.

The external supply of fuel (symbol $CH_4$) vertically relative to the plate plane and of the oxygen carrier (symbol $O_2$) parallel to the plate plane provides ideal ratios for the entire installation with respect to ducts, pipelines, heat exchangers and other accessories. Only by means of this is it possible to construct and maintain industrial large-scale systems at reasonable expense.

An optimal feed and distribution of the gaseous media, meaning also the fuel in particular, results in that ducts and openings are provided which ensure an optimal guidance of gas into the separating plates. A particularly advantageous construction of the invention consists in that the separating plates are provided with an outwardly projecting continuation in the cold region of the device for introducing gaseous media. As a result, for example, comparatively low temperatures, e.g. less than 300° C., prevail in this region so that all seals to be provided can be of a conventional type, i.e. they need not be resistant to high temperatures. For example, they can be made of a temperature-resistant plastic such as polytetrafluoroethylene.

The construction of the current collectors in the manner indicated in the subclaims results in an abundance of constructional advantages as already mentioned above in principle.

Further details, features and advantages of the invention can be seen from the following description and with reference to the drawing:

DETAILED DESCRIPTION OF THE PREFERRED EMBODIMENT

Figure 1:
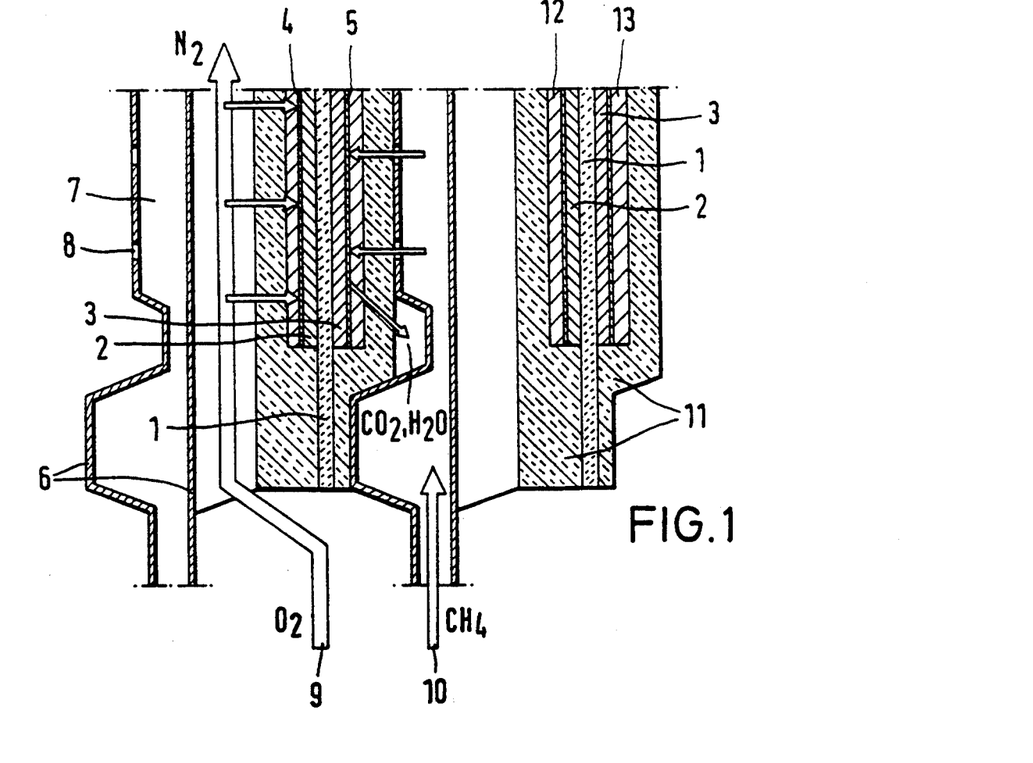
FIG. 1 shows a schematic vertical projection/section of the principle construction of the fuel cell arrangement.

A schematic vertical projection/section of the principle construction of an apparatus according to the invention is shown in FIG. 1. A ceramic solid electrolyte 1 of a doped and stabilized metallic oxide, e.g. of $ZrO_2$ stabilized with $Y_2O_3$, which conducts oxygen ions has a porous (positive) oxygen electrode 2 of La/Mn perovskite doped with SrO on one side and a porous (negative) fuel electrode 3 of $Ni/ZrO_2$ cermet. A thin Cr surface film 4 is located on the oxygen electrode 2 and a thin Ni surface film 5 is located on the fuel electrode 3.

A gastight separating plate 6 which is constructed as a hollow body and serves to separate the gas space in front of the oxygen electrode 2 from that of the opposing fuel electrode 3 of the adjacent fuel cell is shown in FIG. 1 approximately in the center and at the far left side. The separating plate 6 has ducts 7 with openings 8.

The supply of gaseous oxygen carrier (symbol $O_2$), e.g. pure oxygen or air, to the fuel cell is designated by 9, while the supply of gaseous fuel (symbol $CH_4$, generally for methane, hydrocarbons, $H_2$ or CO) is designated by 10.

A ceramic, gas-permeable intermediate layer 11 in the form of a felt or fleece acting as a high-temperature spring encloses a current collector 12 on the oxygen side and a current collector 13 on the fuel side, the current collectors 12 and 13 being pressed uniformly against the electrodes 2 and 3 by these highly elastic intermediate layers 11. The intermediate layers 11 are supported on the aforementioned separating plates 6 along the entire surface. A contact pressure of the current collector which remains constant along the entire electrode surface and a uniform current distribution are accordingly achieved.

In the drawings, the flow of the gaseous media $O_2$, $CH_4$, $N_2$, $CO_2$, $H_2O$ is indicated by arrows, wherein $N_2$ indicates in general ballast gas (usually nitrogen or residual oxygen) on the oxygen side and $CO_2$ or $H_2$ for reaction products (usually carbon dioxide, water vapor or residual fuel), i.e. waste gas, on the fuel side.

Figure 2:
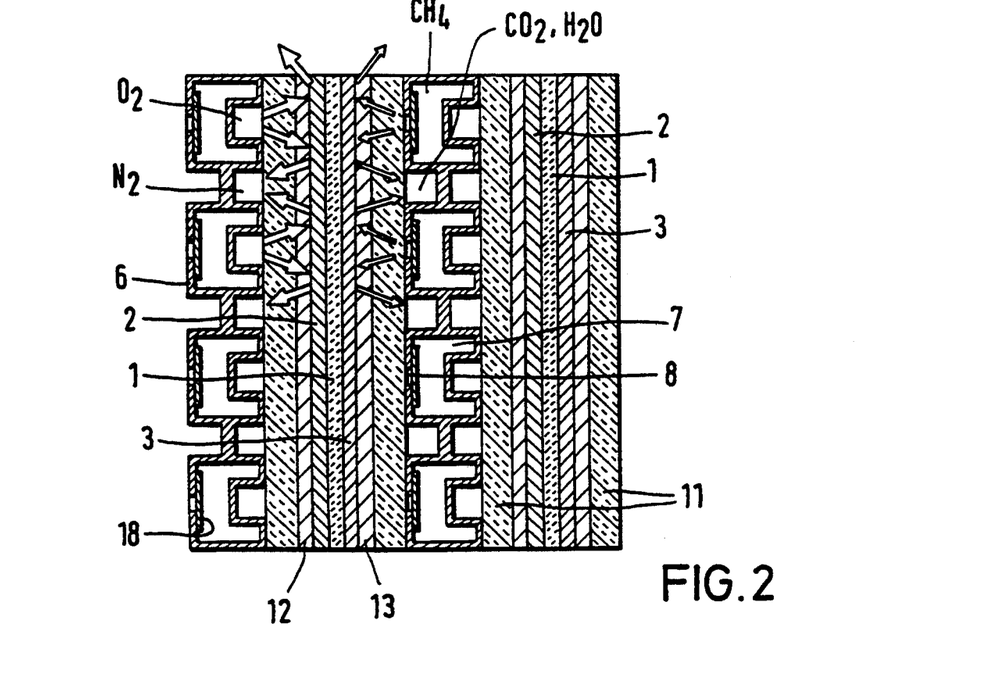
FIG. 2 shows a schematic horizontal projection/section of the principle construction of the fuel cell arrangement.

As shown in FIG. 2, a catalyst 18 which possibly accelerates the endothermal conversion reaction of the primary fuel ($CH_4$) with the reaction product ($CO_2$ or $H_2O$) or with externally supplied gases of identical or similar composition into secondary fuel (CO and $H_2$) is located in the hollow space of the separating plate 6 in the ducts 7 on the fuel side.

Figure 3:
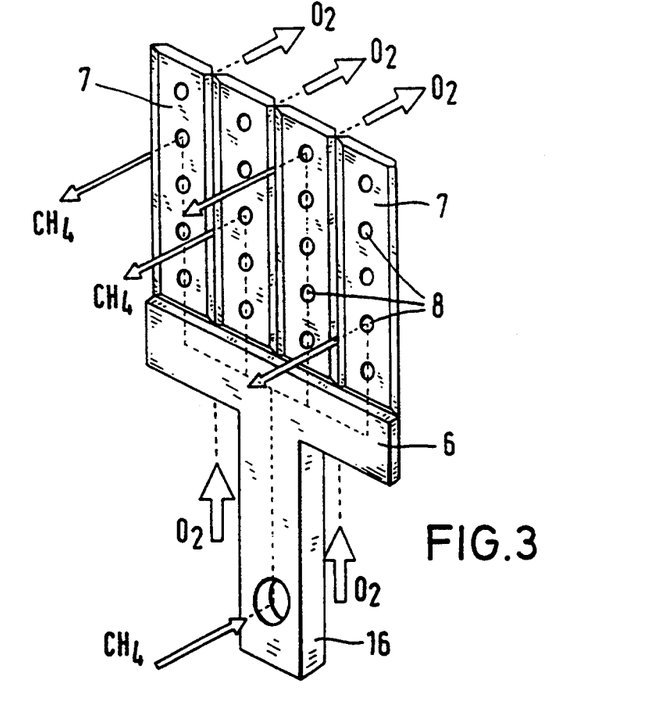
FIG. 3 shows a perspective view of the principle construction of the separating plate constructed as a hollow body.

As shown in FIG. 3, the separating plate 6 has a continuation 16 which projects out in the manner of a handle and serves to feed the fuel ($CH_4$).

The arrows in the drawings indicate the flow direction in the gaseous media. The finely dotted lines show the streamlines of the fuel ($CH_4$) inside the hollow burning plate 7 in a schematic manner and the dashed lines show the streamlines of the oxygen carrier ($O_2$) behind the separating plate. The outlet directions of $CH_4O_2$ are directed opposite one another and are situated vertically on the plate plane. They face toward the adjacent electrode, not shown in FIGS. 3 and 4.

Figure 4:
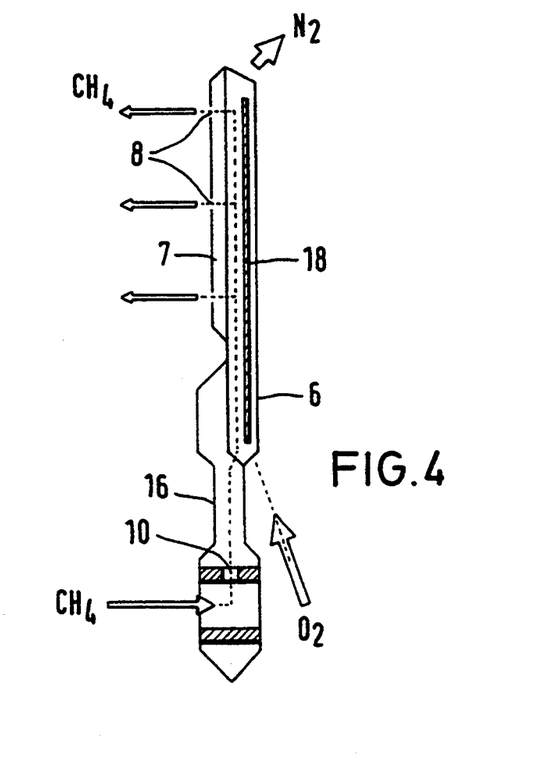
FIG. 4 shows a schematic vertical projection/section of the separating plate constructed as a hollow body.
Figure 5:
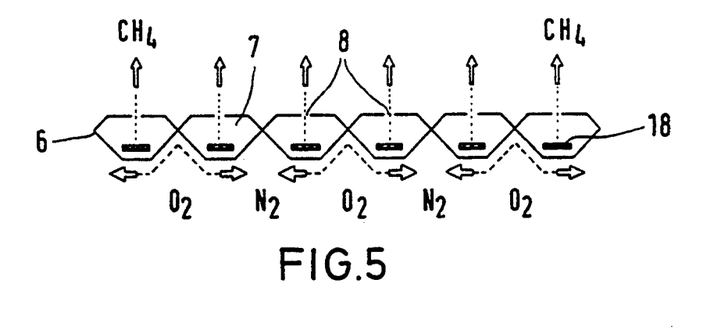
FIG. 5 shows a schematic horizontal projection/section of the separating plate constructed as a hollow body.

As shown in FIG. 4, the fuel cell has an inner supply for the fuel which is effected in the example shown in the drawing by means of an opening 10 in the interior of the continuation 16 of the separating plate 6, which continuation 16 projects out in the manner of a handle. The fuel ($CH_4$) is guided in the interior of the separating plate 6, while the oxygen carrier $O_2$ flow along the outside of the profiled separating plate 6, the outlet of the charging gas at the edge of the separating plate being indicated by $N_2$, wherein the conditions of flow are shown again in the simplified view of FIG. 5.

Figure 6:
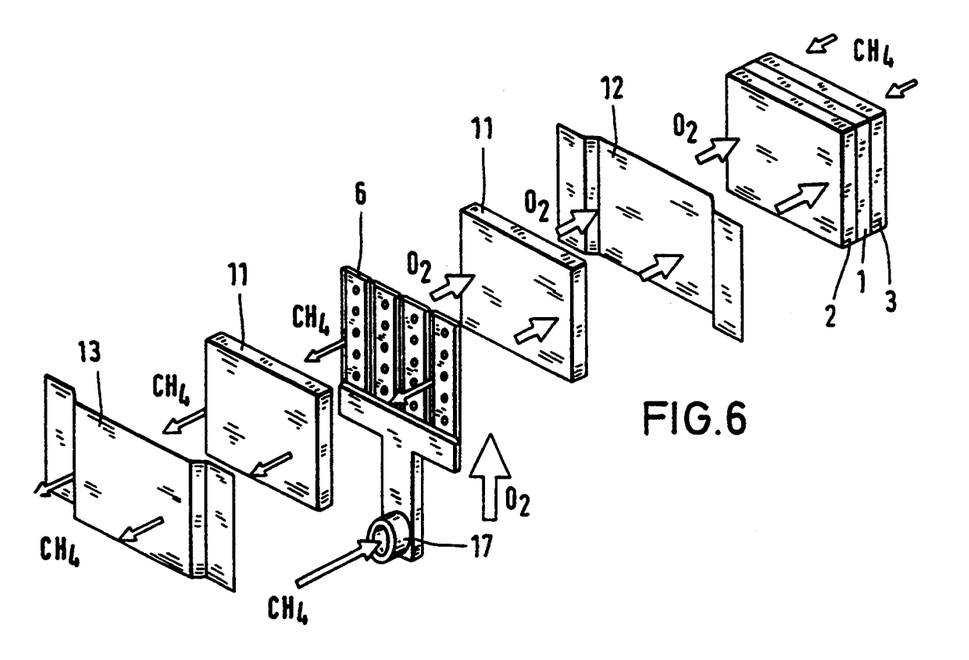
FIG. 6 shows a perspective exploded view of the principle construction of the fuel cell with the individual construction elements.

FIG. 6 shows the arrangement of the individual constructional elements in a so-called exploded view. As shown in this view, the current collector 13 is penetrated by the fuel flow ($CH_4$) vertically relative to the plate plane. The fuel flow ($CH_4$) likewise flows vertically relative to the plate plane through the following intermediate layer 4 of felt-like or fleece-like plates which, as already described, acts vertically with respect to the plate plane as a high-temperature spring. As can be seen, the feed line continuation 16 for feeding the fuel (4) which projects out in the manner of a handle is located outside the region of high temperature so that the sealing element designated by 17 in the gaseous media need not be resistant to high temperatures.

The intermediate layer 11 on the oxygen side has the same function as the ceramic intermediate layer on the fuel side, already mentioned above, wherein the $O_2$ flow in the flow collector 12 on the oxygen side flows through vertically relative to the plate plane and occurs vertically on the porous (positive) oxygen electrode 2 of the actual fuel cell. Every ceramic solid electrolyte is designated by 1 and the fuel electrodes are designated by 3 in FIGS. 1 and 2. As shown in the view according to FIG. 6, the external feed line of the fuel ($CH_4$) is effected substantially vertically and that of the oxygen ($O_2$) substantially parallel to the plate plane of the fuel cell 1, 2, 3 and of the entire stacked arrangement of fuel cells.

Figure 7:
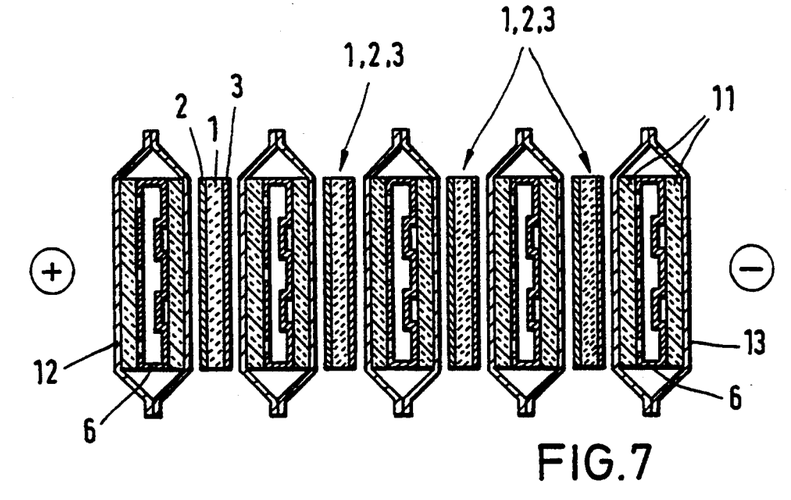
FIG. 7 shows a schematic section through a stack including a plurality of fuel cells and connecting constructional elements.
Figure 8:
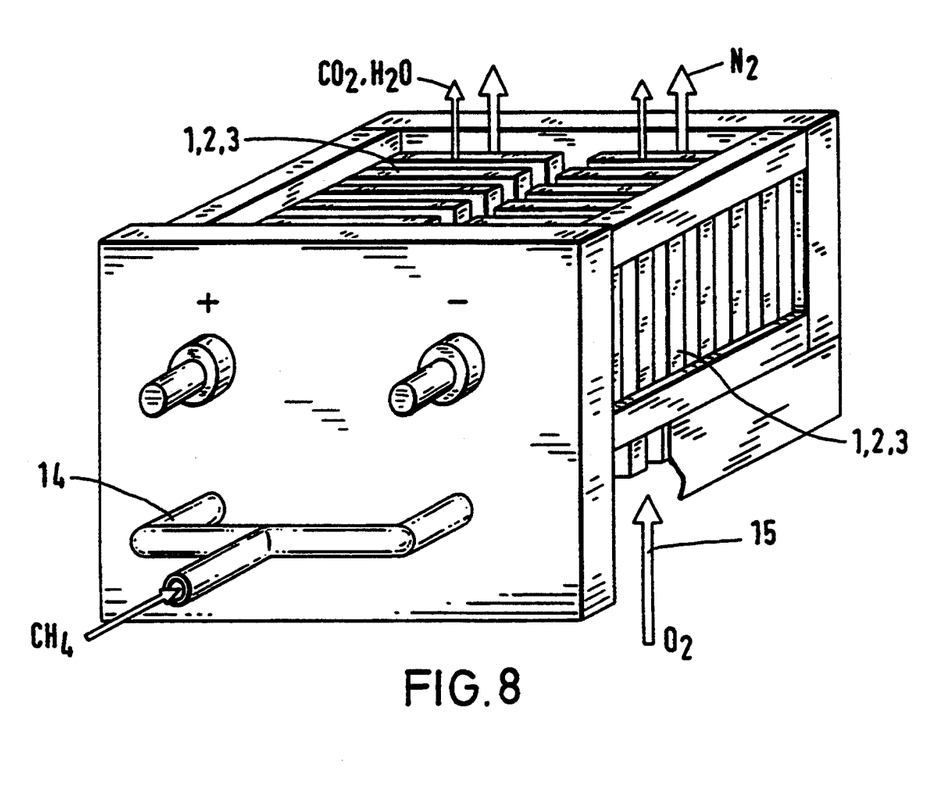
FIG. 8 shows a perspective view of a module including two stacks of fuel cells connected in series.

Such a stack of fuel cells is shown in section in a simplified manner in FIG. 7 and in FIG. 8, wherein FIG. 7 can be either a horizontal projection or a vertical projection. As can be seen, the fuel cells designated by 1, 2, 3 are separated from one another by separating plates with a duct structure, designated by 6. In FIG. 7, the current collector 12 on the oxygen side is connected at the front sides with the current collector 13 on the fuel side of the adjacent fuel cell so as to be electrically conducting. The polarities of the terminals (not shown in more detail) are designated by + and −. The apparatus indicated in a perspective view in FIG. 8, as described, includes fuel cells 1, 2, 3, particularly according to the arrangement in FIG. 7. The constructional elements situated between the fuel cells, e.g. the current collectors, intermediate layers and separating plates, are not shown in detail for reasons of clarity. An external feed line duct 14 for the fuel ($CH_4$), which is vertical relative to the plate plane, is shown in a suggestive manner, while the external feed line duct for the oxygen carrier ($O_2$) parallel to the plate plane is indicated only by arrow 15. The flow direction for the gases and polarities of the terminals are also indicated according to the above description.

Figure 9:
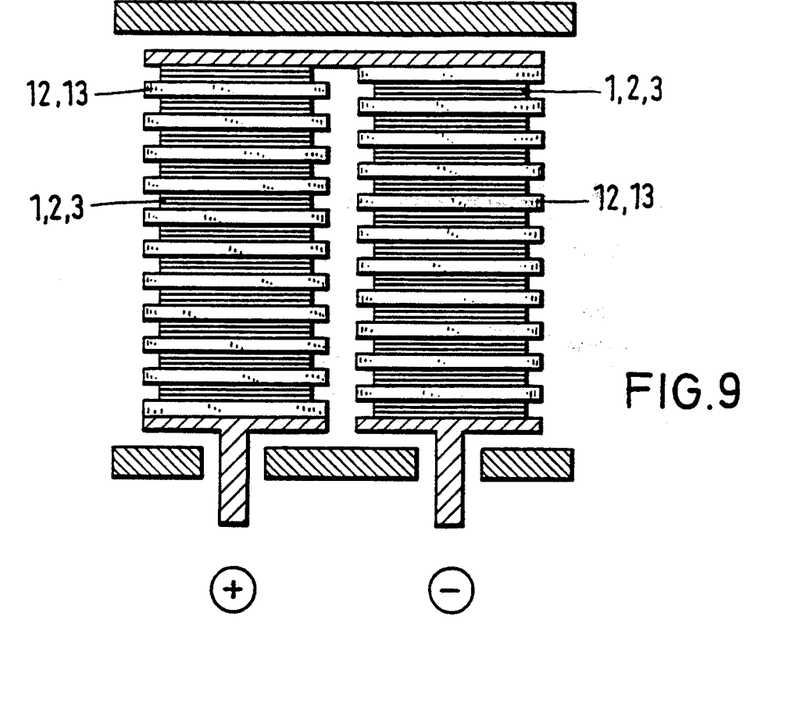
FIG. 9 shows a schematic horizontal projection/section through a module including two stacks of fuel cells connected in series.
Figure 10:
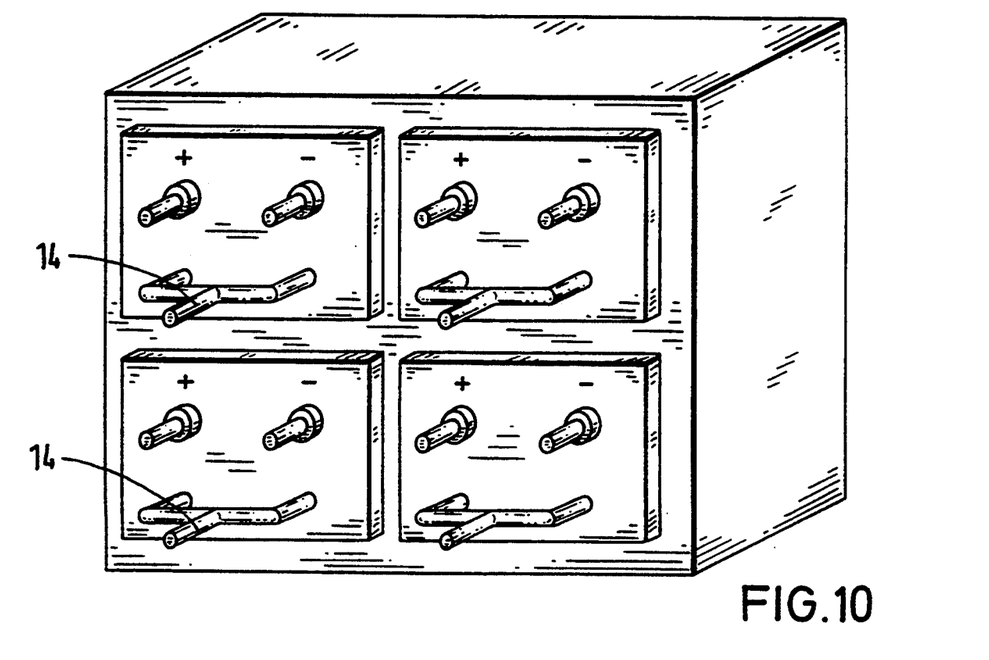
FIG. 10 shows a perspective view of a block of fuel cells including four modules.

It can be seen from FIGS. 9 and 10 that the fuel cells are constructed as modules which can be connected in series. A stack of fuel cells which is connected in two series is shown in FIG. 9. FIG. 10 shows the perspective simplified view of a block of fuel cells including four modules. Of course, the invention is not limited to the number of modules shown here.

Figure 11:
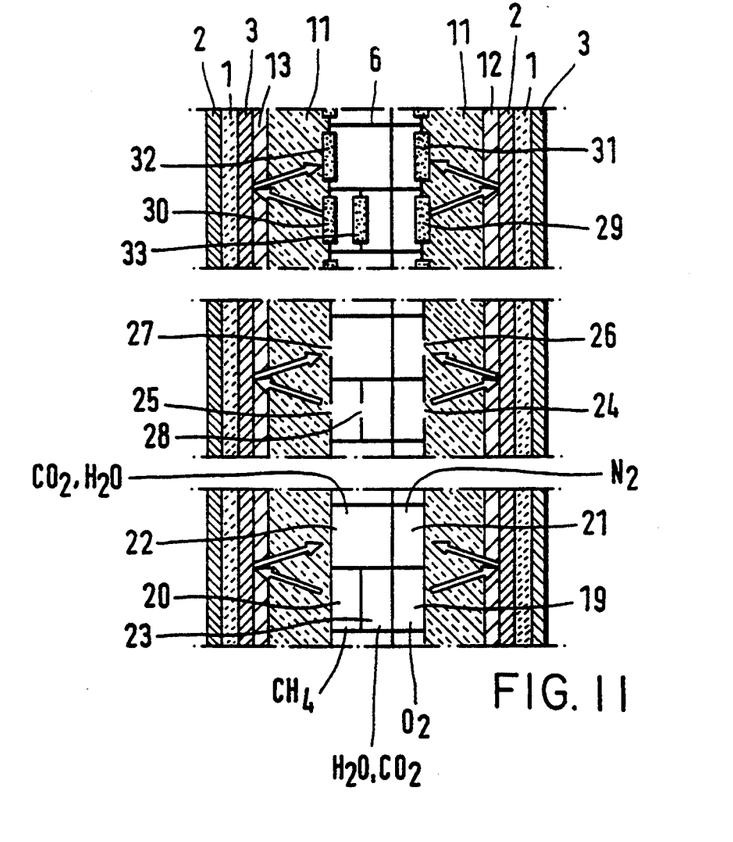
FIG. 11 shows a schematic section through two adjacent fuel cells with a separating plate which is situated between the latter and has a plurality of ducts.

FIG. 11 shows a schematic section through two adjacent fuel cells with a separating plate having a plurality of ducts located between these fuel cells. The current collectors 12 and 13 and the gas-permeable intermediate layers 11 (highly elastic intermediate members) and the separating plate 6 are located between two adjacent fuel cells designated by 1, 2, 3. In the present case, the separating plate 6 which is constructed as a hollow body has a plurality of ducts and openings serving to guide the gaseous media. The duct for supplying the oxygen carrier ($O_2$) is designated by 19, the duct for supplying the fuel ($CH_4$) is designated by 20. The duct for guiding off the residual oxygen and the ballast gas ($N_2$) on the oxygen side is designated by 21. The duct for guiding away the reaction products ($CO_2$, $H_2O$) on the fuel side is designated by 22. A special duct for supplying reaction gases ($H_2O$, $CO_2$) which are fed to the fuel cell arrangement from the outside additionally in order to carry out aimed for chemical conversion reactions is designated by 23. An opening for the supply of the oxygen carrier ($O_2$) to the fuel cell 1, 2, 3 is designated by 24. An opening for supplying fuel ($CH_4$) to the fuel cell 1, 2, 3 is designated by 25. An opening for guiding away the residual oxygen and the ballast gas ($N_2$) is designated by 26 and an opening for guiding away the reaction products ($CO_2$, $H_2O$) from the fuel cell 1, 2, 3 is designated by 27. An opening between adjacent ducts for deliberate mixing of gaseous media, e.g. for initiating the conversion reactions, is designated by 28. An open-pore constructional element for supplying the oxygen carrier ($O_2$) to the fuel cell which has substantially the same function as the opening 24 is designated by 29. A corresponding open-pore constructional element 30 serves to supply the fuel ($CH_4$) and has the same function as the opening 25. An open-pore constructional element for guiding away the residual oxygen and the ballast gas ($N_2$) which has the same function as the opening 26 is designated by 31. An open-pore constructional element serving to carry off the reaction products ($CO_2$, $H_2O$) and having the same function as the opening 27 is designated by 32. The open-pore constructional element 33 between adjacent ducts has the same function as the opening 28. Of course, the openings and open-pore constructional elements in the separating plate 6 can also exist in an optional different combination other than that shown in FIG. 11.

Figure 12A:
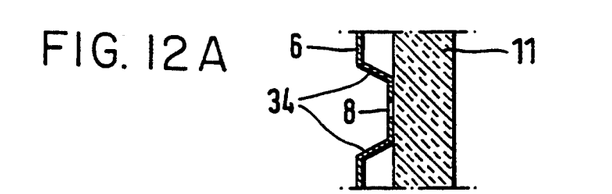
FIG. 12 shows a schematic section through three variants of the contacting contour between the separating plate and gas-permeable intermediate layer.
Figure 12B:
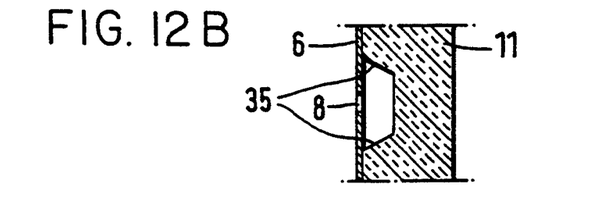
Figure 12C:
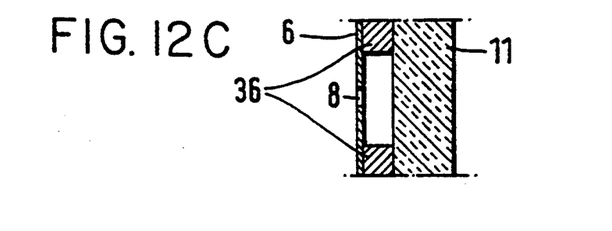

FIG. 12 shows a schematic section through three variants of the contact contour between the separating plate and gas-permeable intermediate layer. The gas-tight separating plate constructed as a hollow body is designated by 6. An opening in the separating plate is designated by 8 and the ceramic, gas-permeable intermediate layer in the form of a fleece or felt acting vertically relative to the plate plane as a high-temperature spring is designated by 11. According to variant a, the separating plate 6 has a profiled outer surface 34, while the intermediate layer 11 is defined by a plane. In variant b, exactly the opposite is true: the intermediate layer 11 has a profiled outer surface 35, while the contour of the separating plate 6 is planar. According to variant c, the outer surface of both the separating plate 6 and the intermediate layer 11 are defined by a plane. In the present case, a profiled flow guide element 36 is located between the separating plate 6 and the intermediate layer 11.

Figure 13A:
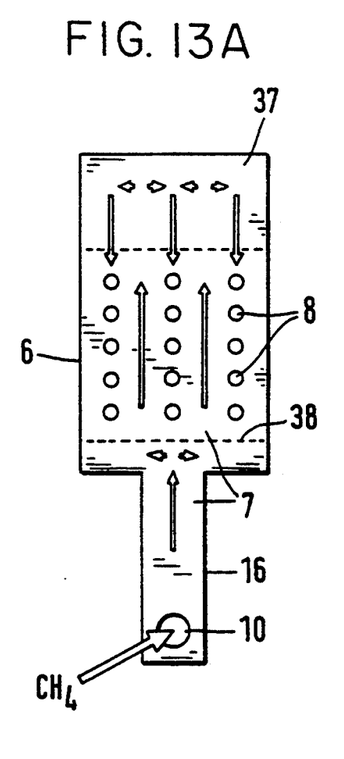
FIG. 13 shows a schematic vertical projection of two variants of the separating plate with different guidance of the gaseous media.
Figure 13B:
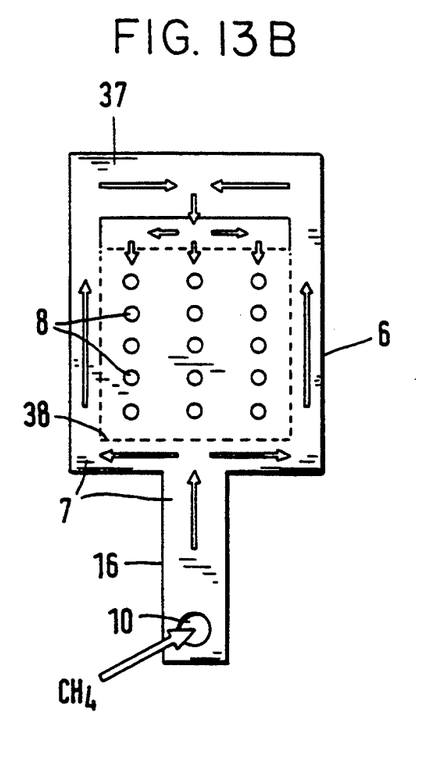

FIG. 13 shows a schematic vertical projection of two variants of the separating plate with different guidance of the gaseous media. In both cases, the separating plate 6 has ducts 7 and is provided with a continuation 16 which projects out in the manner of a handle, the internal feed 10 of the fuel ($CH_4$) being effected at the outer end of the latter. Openings in the separating plate 6 are designated by 8. The flow directions of the fuel ($CH_4$) are indicated by arrows, the streamlines are indicated by finely dotted lines. A portion of the separating plate 6 which reaches into the afterburning region and is constructed as a heat exchanger is designated by 37. The projection of the actual active fuel cell plate on the plate plane is designated by 38. In the case of variant a, the portion 37 is constructed as a tab-like continuation, and it is acted upon by fuel ($CH_4$) via the interior of the separating plate 6, while in variant b the portion 37 can be conceived as a continuation of a hollow frame which encloses the separating plate 6 and is located in the afterburning zone surrounding the separating plate 6 and is, therefore, intensively heated, wherein the heat which is supplied at higher temperatures is used to carry out the endothermal conversion reactions of the fuel ($CH_4$).

A stack was produced from twenty fuel cells and corresponding additional constructional elements required for conducting electrical current and for holding it together mechanically. The actual fuel cell includes a ceramic, plate-shaped, rectangular, planar solid electrolyte 1 of stabilized, doped $ZrO_2$ of 100 mm width, 110 mm length, and 0.25 mm thickness. The solid electrolyte was coated on one side on a square surface of 100 mm lateral length with a porous oxygen electrode 2 of Sr-La/Mn perovskite and a thickness of 0.09 mm. The fuel electrode 3 having the same surface area and with a thickness of 0.05 mm was produced from $Ni/ZrO_2$-cermet and was applied in the same way to the other side of the solid electrolyte 1. Accordingly, a strip having a width of 10 mm remains uncoated at the narrow side of the solid electrolyte 1 on both sides. A Cr surface layer 4 having a thickness of 10 mm was vapor-deposited onto the oxygen electrode 2 and a Ni surface layer 5 of the same thickness was vapor-deposited on the fuel electrode 3.

The gastight separating plate 6 designed as a hollow body was produced from two half-shell sheet metal bodies having a thickness of 0.1 mm and comprising a non-scaling Fe/Cr/Al alloy according to German Industrial Standard DIN with the designation CrAl20 5 and the material number 1,4767. The alloy has the following composition:

Cr=20 percent by weight
Al=5 percent by weight
Si=0.8 percent by weight
Mn=0.7 percent by weight
C=0.08 percent by weight
Fe=remaining.

The two half-shells were welded in a gastight manner at the edge along the entire circumference and connected in the center region by a few welds to a hollow structure having ducts 7. Four rows, each comprising five holes with a diameter of 0.5 mm, were arranged on the fuel side in the region of the actual fuel cell 1, 2, 3, the fuel ($CH_4$) can exit through these holes vertically relative to the plate plane. The separating plate 6 was provided with a continuation 16 projecting out in the manner of a handle and having a length of 100 mm, through which the internal feed 10 of the fuel ($CH_4$) was effected. Concretely, the feed 10 of fuel ($CH_4$) was effected via an annular ceramic part provided with radial openings and situated at the feed end of the continuation 16 between the half-shells. The rectangular region of the separating plate 6 on both sides was covered with a ceramic, gas-permeable intermediate layer 11 of a $ZrO_2$ fleece having a thickness of 1 mm and acting as a high-temperature spring. The current collector 12 was placed on the intermediate layer 11 on the oxygen side in the form of a finely meshed metallic woven tissue of heat-resistant Ni/Cr alloy with the trade name Inconel 690 (INCO) having the following composition:

Cr=30 percent by weight
Fe=9.5 percent by weight
C=0.03 percent by weight
Ni=remaining.

On the fuel side, the current collector 13 was placed on the intermediate layer 11 in the form of a finely meshed woven tissue of nickel and welded at the projecting edges of the broad side with the current collector 12 of the oxygen side. In this way, the current conduction from one side of the separating plate 6 to the other side is ensured regardless of certain operating parameters.

A total of twenty-one plate-shaped bodies were manufactured in each instance from a hollow separating plate 6, two ceramic, gas-permeable intermediate layers 11, a current collector 12 on the oxygen side and a current collector 13 on the fuel side. At the same time, a total of twenty ceramic plates including solid electrolyte 1, oxygen electrode 2, and fuel electrode 3 were produced. The separating plate bodies were then arranged one behind the other and assembled in an alternating manner with the fuel cell plates. The entire stack was pressed together by exerting a force of 200N acting vertically relative to the plate plane and were held in this pretensioned position by means of an external metallic frame. The center area pressure in the stack was accordingly approximately 20 kPa.

The fuel ($CH_4$) was supplied, via an external feed line duct 14, to the lower end of the continuation 16 of the separating plate 6 which was provided with an opening. The feed line duct 14 had the form of a continuous pipe provided with lateral slits which was provided at the feed end with a hexagon part and at the other end with a thread with a cap nut. Sealing elements 17 of polytetrafluoroethylene were attached at the two ends of this pipe and between each of the two adjacent separating plates 6 for sealing the feed of the fuel ($CH_4$). Electrically insulating ceramic plates of $Al_2O_3$ were arranged at the two ends of the metallic frame holding together the stack. An electric + or − terminal was welded on at the last respective current collector 12 or 13.

The fuel cell stack was installed in an apparatus in which preheated air was introduced from below under slight overpressure as oxygen carrier. After switching on the air blower and the fuel supply 14, the gases which were guided separately through the fuel cell were ignited electrically in the afterburning zone connected downstream of the fuel cell. The heat generated by combustion was then transmitted into the atmosphere via a heat exchanger integrated in the device. The air which is preheated in this way arrived via an external feed line duct 15 in the region of the fuel cells via the internal supply 9 to the ducts for the oxygen carrier formed by the outer surface of the profiled separating plate 6. These fuel cells were thus heated at the top by the air flowing along on the oxygen side.

After reaching a temperature of approximately 650° C., the electrochemical conversion of the fuel ($CH_4$), in the present case $H_2$, took place. This fuel flowing through the fuel cell at this temperature was still not used for the most part, although an electrical voltage could already be determined at a very low current density. The fuel flowing out of the stack was further reacted and burned with the hot air in the afterburning zone located directly after the fuel cell, wherein the heat being released in the heat exchanger was made use of for additional heating of the supplied air. The fuel cells accordingly reached a temperature of 850° C. within a short time (approximately 30 minutes) at which the electrochemical conversion of the fuel with the oxygen in the air took full effect.

The fuel cell arrangement was adjusted to an operating temperature of 850° C. via built-in thermostats. When this temperature was reached, the fuel flow was influenced via a regulator in such a way that an electrochemical conversion of 50% was achieved. The oxygen carrier (air) was adjusted via another regulator in such a way that a constant operating temperature of 850° C. was maintained. A fixed standard current of 20 A was carried at a nominal current density of 0.2 A/cm$^2$ of a one-sided active electrode surface. The cell voltage was an average 0.73 V, the overall voltage of the stack (twenty cells) was 14.6 V, and the output was 282 W. The mean conversion intensity per fuel cell surface (output density) was accordingly 0.146 W/cm$^2$.

What is claimed is:

1. An apparatus for converting chemical energy of a fuel into electrical energy, the apparatus comprising:
   a plurality of high-temperature fuel cells arranged parallel to each other and having each:
   a solid electrolyte,
   an oxygen electrode comprising Mn oxides doped with SrO and having a Cr surface layer, and
   a fuel electrode comprising Ni/ZrO$_2$ cermet and having a Ni surface layer;
   a non-conductive separating plate formed as a double shell hollow body and arranged between each two adjacent fuels cells for separating oxygen environment of said oxygen electrode of one of the two adjacent fuel cells from a fuel gas environment of said fuel electrode of another of the two adjacent fuel cells, and for supplying gaseous media to the fuel cell and for carrying off the gaseous media form the fuel cell;
   current collectors which are adjacent respective said oxygen electrode and said fuel electrode for electrically connecting adjacent fuel cells; and
   a non-conductive highly elastic gas-permeable constructional element located between the separating plate and a respective current collector for pressing the respective current collector to a respective one of the fuel and oxygen electrodes substantially along an entire surface of the respective current collector.

2. The apparatus of claim 1, wherein the fuel cells are planar plates and have planes, which are arranged vertically, and wherein the separating plate includes ducts and openings for guiding, distributing and collecting the gaseous media, said apparatus further comprising at least one external fuel feeding duct arranged vertically on a plate plane, and at least one external oxygen carrier feeding duct extending parallel to the plate plane.

3. The apparatus of claim 1, wherein the fuel cells are planar plates, and wherein said apparatus further comprises at least one external fuel feeding duct arranged vertically on a plate plane, and at least one external oxygen carrier feeding duct extending parallel to the plate plane.

4. The apparatus of claim 1, wherein the separating plate has a continuation, which projects beyond a contour of a fuel cell stack, for feeding the gaseous media in a cold region of the apparatus.

5. The apparatus of claim 1, wherein the separating plate is profiled for supplying fuel and an oxygen carrier and for guiding out at least one of residual fuels of reaction products and residual oxygen and ballast materials, with quasi-isothermal operation of the fuel cells along entire plate plane thereof in an optimal manner with respect to the mechanics of flow, wherein the separating plate is provided with a group of ducts, and wherein the ducts are provided with at least one of corresponding openings, open-pore constructional elements directed to the fuel cells, and openings and open-pore constructional elements between adjacent ducts.

6. The apparatus of claim 1, wherein the separating plate is provided with a group of ducts, and wherein the ducts are provided with at least one of corresponding openings, open-pore constructional elements directed to the fuel cells, and openings and open-pore constructional elements between adjacent ducts.

7. The apparatus of claim 1, wherein one of the current collectors is fixedly connected with the Ni surface layer of the fuel electrode and another of the current collectors is fixedly connected with the Cr surface layer of the oxygen electrode and wherein peripheral portions of the one and another current collectors are guided out laterally and are connected with one another and with the separating plate in a fixed manner so as to provide for connection of the fuel cells.

8. The apparatus of claim 1, wherein the gas-permeable constructional element is constructed from one of metallic and felted ceramic, highly elastic, gas-permeable material for acting as flow distributor for the gaseous media and as an element for controlling heat conduction.

9. The apparatus of claim 1, wherein the gas-permeable constructional element is constructed from one of metallic and felted ceramic, highly elastic, gas-permeable material for acting as an element for controlling heat conduction.

10. The apparatus of claim 1, wherein said separating plate is formed of non-scaling Fe/Cr/Al alloy, with a catalyst provided in a hollow space of said separating plate on a fuel side thereof for accelerating endothermal conversion reactions and a water/gas equilibrium.

* * * * *